United States Patent [19]
Takahashi et al.

[11] Patent Number: 5,929,899
[45] Date of Patent: *Jul. 27, 1999

[54] ELECTRONIC ENDOSCOPE WHICH STORES IMAGE SIGNALS OF THE THREE PRIMARY COLORS SUPPLIED IN A FIELD-SEQUENTIAL SYSTEM INTO A SINGLE MEMORY USING A POINT-SEQUENTIAL SYSTEM

[75] Inventors: Akihiro Takahashi; Kohei Iketani, both of Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/683,989

[22] Filed: Jul. 19, 1996

[30] Foreign Application Priority Data

Jul. 24, 1995 [JP] Japan .................................... 7-186742

[51] Int. Cl.[6] ............................... A62B 1/04; H04N 7/18; H04N 9/47; H04N 9/64
[52] U.S. Cl. .................................. 348/65; 348/70; 348/714
[58] Field of Search .................................. 348/65–72, 76, 348/714–718; 600/101, 109, 160, 173, 177–181; 358/98

[56] References Cited

U.S. PATENT DOCUMENTS

| | | | |
|---|---|---|---|
| 4,791,479 | 12/1988 | Ogiu et al. | 358/98 |
| 4,868,645 | 9/1989 | Kobayashi | 358/98 |
| 4,926,258 | 5/1990 | Sasaki et al. | 358/98 |
| 5,031,036 | 7/1991 | Kikuchi et al. | 358/98 |
| 5,113,254 | 5/1992 | Kanno et al. | 358/98 |
| 5,408,268 | 4/1995 | Shipp | 348/269 |

*Primary Examiner*—Douglas W Olms
*Assistant Examiner*—David R Vincent
*Attorney, Agent, or Firm*—Greenblum & Bernstein, P.L.C.

[57] ABSTRACT

An electronic endoscope in which images of an object to be viewed are picked-up in a field-sequential system by a solid-state image pickup device. The electronic endoscope includes a primary converter for converting different color image signals picked-up by the solid-state image pickup device and successively output therefrom, into digital image signals. A single memory temporarily stores the digital image signals in a point-sequential system. A secondary converter converts the digital image signals successively read from the single memory, into analog image signals. A delay delays a part or all of the analog image signals by different delay times to synchronize the color image signals.

20 Claims, 6 Drawing Sheets

ELECTRONIC ENDOSCOPE WHICH STORES IMAGE SIGNALS OF THE THREE PRIMARY COLORS SUPPLIED IN A FIELD-SEQUENTIAL SYSTEM INTO A SINGLE MEMORY USING A POINT-SEQUENTIAL SYSTEM

BACKGROUND OF THE INVENTION

1. Field of the Invention

The present invention relates to an electronic endoscope in which images of an object to be viewed are picked-up by a solid-state image pickup device in a field-sequential system.

2. Description of the Related Art

In general, in a known field-sequential type of electronic endoscope, an object is illuminated sequentially by separate illumination lights having three colors, i.e., red (R), green (G) and blue (B), so that images of the object are picked-up by a solid-state image pickup device. The color image signals thus obtained at different timings are digitized and temporarily stored in a memory for each color image signal, respectively. The color image signals stored in the respective memories are simultaneously read therefrom and converted into analog signals which are then output in accordance with need.

As can be understood from the foregoing, in the known electronic endoscope, it is necessary to provide three separate memories in which the three color image signals are temporarily stored in order to synchronize the three color image signals. However, this results in a need for complex circuitry, thus leading to an increase in the size and manufacturing cost of the endoscope.

SUMMARY OF THE INVENTION

It is an object of the present invention to provide an inexpensive and small electronic endoscope in which a circuit to process image signals obtained in a field-sequential system by a solid-state image pickup device is made small to reduce the manufacturing cost.

To achieve the object mentioned above, according to an aspect of the present invention, there is provided an electronic endoscope in which images of an object to be viewed are picked-up in a field-sequential system by a solid-state image pickup device. The electronic endoscope has a primary converting device for converting different color image signals picked-up by the solid-state image pickup device and successively output therefrom, into digital image signals. A single storing device is provided for temporarily storing the digital image signals in a point-sequential system. A secondary converting device, for converting the digital image signals successively read from the storing device into analog image signals, and a delay device, for delaying a part or all of the analog image signals by different delay times, to synchronize the color image signals are also provided.

Preferably, the delay device is a delay circuit, or could equally be a low-pass filter having predetermined delay characteristics.

The color image signals are preferably image signals of three primary colors.

The storing device is preferably a frame memory or a field memory for storing a frame or a field of the color image signals picked-up by the solid-state image pickup device.

According to another aspect of the present invention, an electronic endoscopic apparatus is provided in which an image signal supplied from a field-sequential system by a solid-state image pickup device, incorporated in a front end of an insertion portion of an endoscope, is sent to a video processor. The endoscopic apparatus has an illuminating light device for sequentially emitting red, green and blue light towards an object. A primary converting device converts red, green and blue color image signals picked-up by the solid-state image pickup device and successively output therefrom digital image signals. A single storing device temporarily stores the digital image signals in a point-sequential system. A secondary converting device converts the digital image signals successively read from the storing device, into analog image signals. A delay device delays a part, or all of the analog image signals, by different delay times to synchronize the red, green and blue image color signals.

Preferably, the solid-state image pickup device picks up one frame (or one field of an object image) while the illuminating light device emits the red, green, and blue light. The solid-state image pickup device sequentially outputs a frame of red image signals, a frame of green image signals and a-frame of blue image signals.

In yet another aspect of the present invention, an electronic endoscope is provided in which images of an object to be viewed are picked-up in a field-sequential system by a solid-state image pickup device. The different color image signals picked-up by the solid-state image pickup device and successively output therefrom are converted into digital color image signals and are temporarily stored in the same memory in a point-sequential system, so that the digital color image signals successively output from the memory are converted into analog color image signals. A part or all of the analog color image signals are delayed by different delay times to synchronize the different color image signals.

The present disclosure relates to subject matter contained in Japanese Patent Application No. HEI 7-186742 (filed on Jul. 24, 1995) which is expressly incorporated herein by reference in its entirety.

BRIEF DESCRIPTION OF THE DRAWINGS

The invention will be described below in detail with reference to the accompanying drawings, in which like reference numerals indicate like members, and wherein.

DESCRIPTION OF THE PREFERRED EMBODIMENTS

Figure 2:
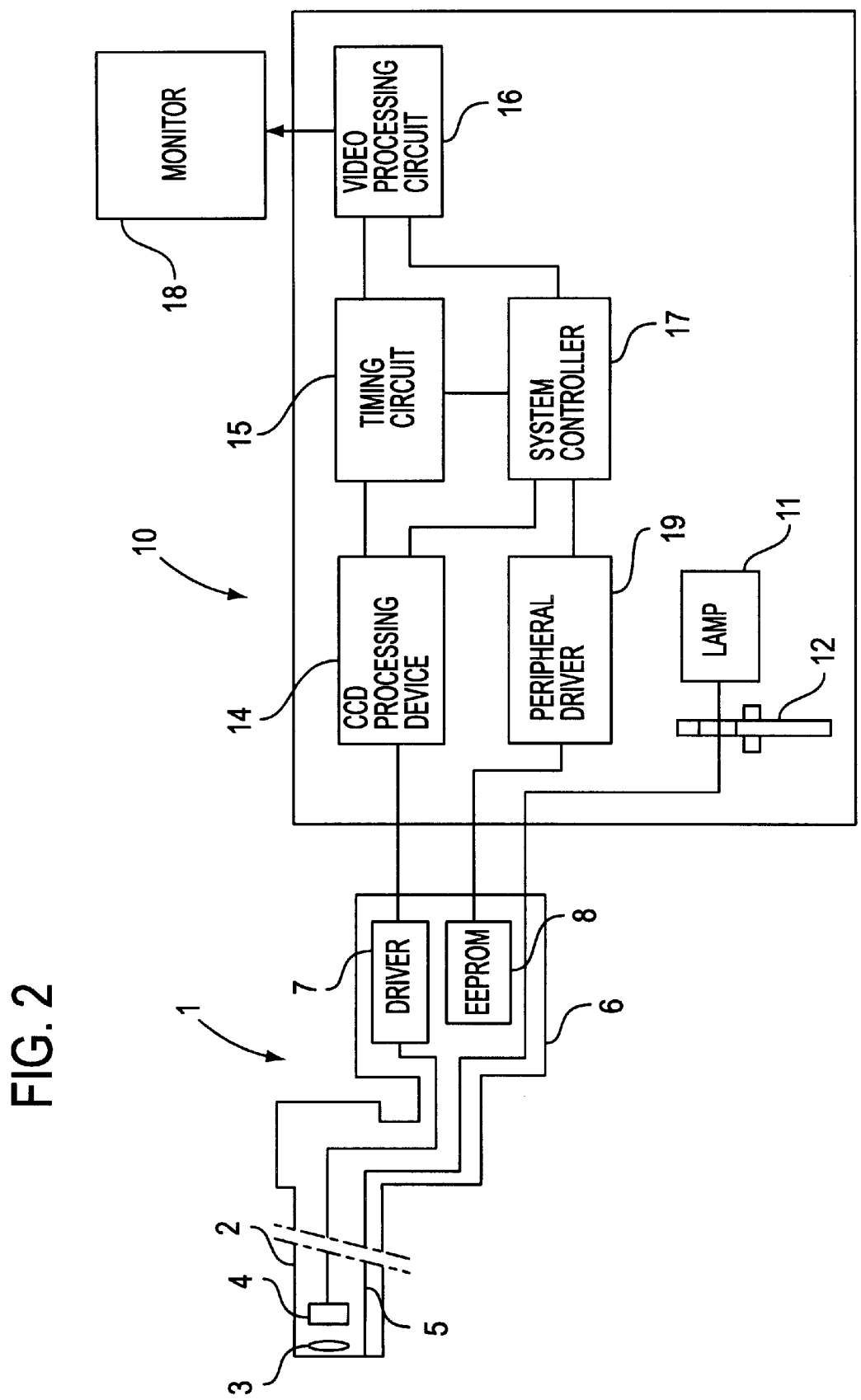
FIG. 2 is a block diagram of an electronic endoscope according to an embodiment of the present invention.

FIG. 2 shows a block diagram of an internal structure of an electronic endoscope according to an embodiment of the present invention.

An endoscope 1 is provided with an insertion portion 2. The insertion portion 2 is provided on a front end thereof with an objective lens system 3 and a solid-state image pickup device 4, consisting of, for example, a charge-coupled device (CCD) located at an image forming position at which an object image is formed by the objective lens system 3. Reference numeral 5 designates a light guiding optical fiber bundle through which illumination light is transmitted to illuminate a viewing area.

The endoscope 1 is provided with a connector 6 which can be connected to a video processor 10. The connector 6 is provided therein with a drive circuit 7, and a rewritable read only memory (EEPROM) 8 in which data inherent to the endoscope 1 is stored. The drive circuit 7 amplifies signals input to or output from the solid-state image pickup device 4.

The video processor 10 is provided with an illuminating light source (lamp) 11 which emits illumination light onto the object to be viewed through the light guiding optical fiber bundle 5 of the endoscope 1.

The video processor 10 is provided therein with a rotary filter unit 12 having three primary color filters, i.e., red (R), green (G) and blue (B), provided in the light path of the illumination light emitted from the lamp 12. The filter unit 12 rotates at a constant speed, so that the red, green and blue illumination lights can be sequentially and repeatedly supplied to the optical fiber bundle (light guide) 5.

A CCD processing device 14 is connected to the drive circuit 7. At an output terminal thereof, the CCD processing device 14 is connected to an input terminal of a video processing device 16 via a timing circuit 15. The output signals of the video processing device 16 are supplied to a monitor 18.

The operation of the CCD processing device 14, the timing chart 15 and the video processing device 16 is controlled in association with each other by a system controller 17 having a central processing unit (CPU). The system controller 17 reads data supplied from the endoscope 1 through the EEPROM 8 to which a peripheral driver 19, connected to the system controller 17, is connected.

Figure 1:
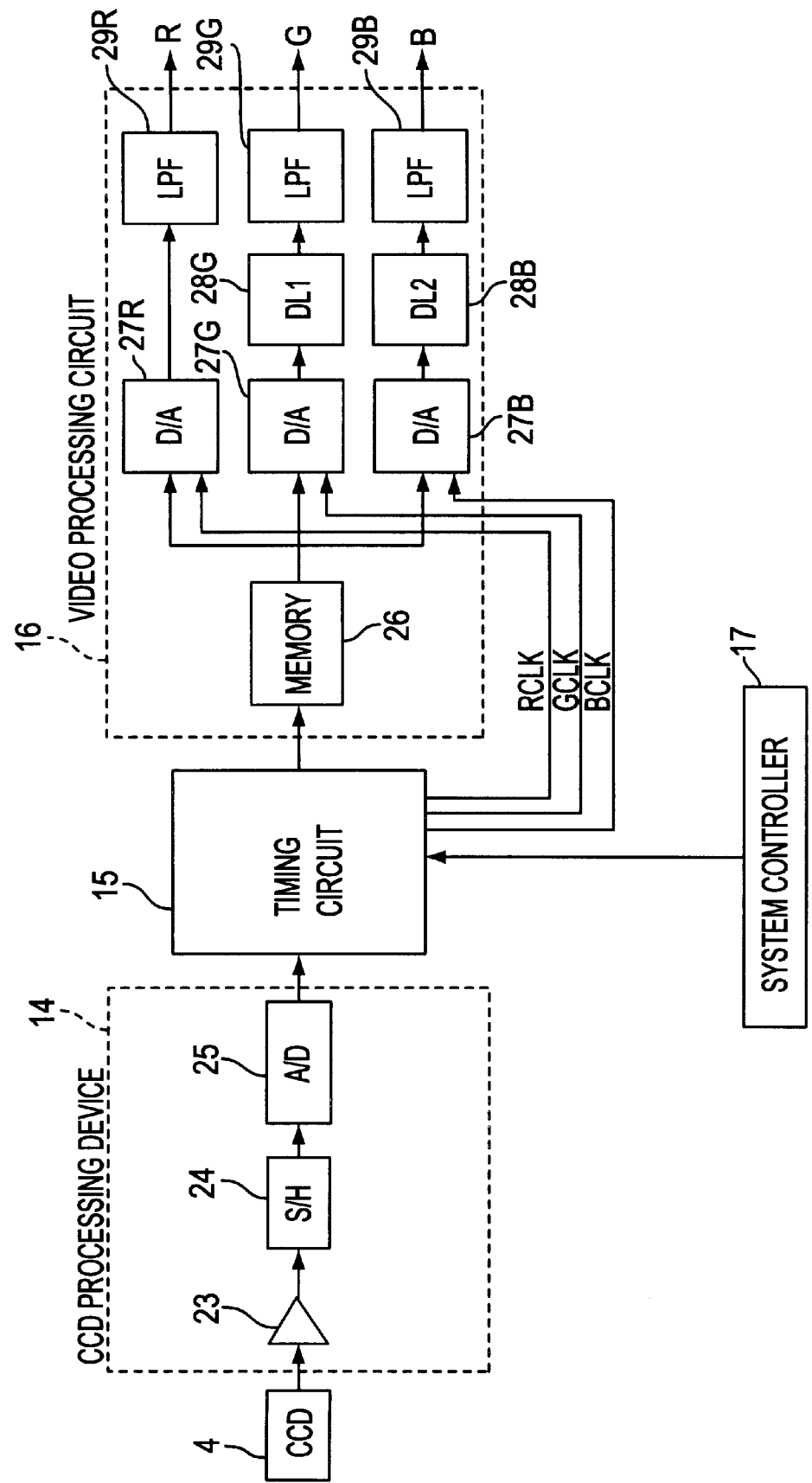
FIG. 1 is a block diagram of a circuit in an electronic endoscope according to the present invention.

FIG. 1 shows an internal structure of the CCD processing device 14 and the video processing device 16.

The solid-state image pickup device 4 is driven in synchronization with a rotation of the rotary filter unit 12 to output picked-up image signals when the illumination lights of the three primary colors, transmitted through the optical fiber bundle 5, are switched. The solid-state image pickup device 4 alternately outputs a frame or a field of primary color image signals. The frames of red color image signals, green color image signals and blue color image signals (i.e., three frames in total) constitute a field of image signals.

The image signals of the primary colors output from the solid-state image pickup device 4 are amplified by an amplifier 23 provided in the CCD processing device 14. The amplified image signals are sampled by a sample-and-hold circuit 24 and are thereafter converted into digital signals by an analog/digital (A/D) converter circuit 25.

The digital signals are synchronized with the drive of the solid-state image pickup device 4 by the timing circuit and are supplied to and temporarily stored in a single memory 26. In the present embodiment, the memory 26 is a frame memory, so that the memory 26 can memorize one frame or one field of image signals of the three primary colors picked-up by the image pickup device 4.

Figure 3:
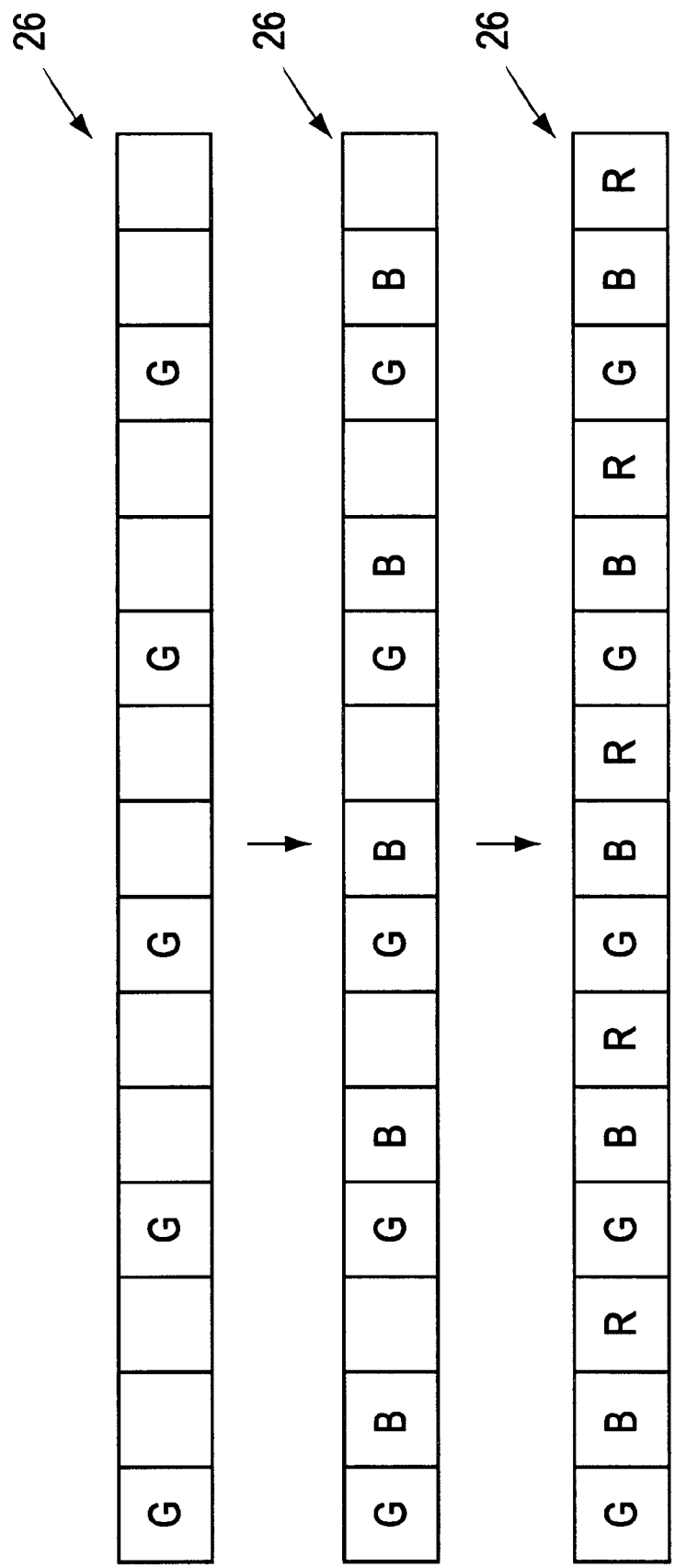
FIG. 3 is a schematic view of data stored in memories incorporated in an electronic endoscope according to the present invention.

Memory addresses are assigned in advance in the memory 26 so that the digital image signals of the three primary colors of red (R), green (G) and blue (B) are repeatedly and sequentially stored in the memory 26, as shown in FIG. 3 which only shows one horizontal line of memory area). Thus, the image signals of the three primary colors successively supplied in the field-sequential system to the memory 26 are stored therein in a point-sequential system along each horizontal line of one frame. The image signals stored in the memory 26 are successively output therefrom in the same order as the input order.

After being successively output from the memory 26, the digital image signals are divided into three routes in which the same image signals are sent to digital/analog converter circuits 27R, 27G and 27B for red, green and blue lights, respectively.

Independent clock pulses RCLK, GCLK, and BCLK, having different phases, are supplied to the respective digital/analog converter circuits 27R, 27G and 27B from the timing circuit 15.

Figure 4:
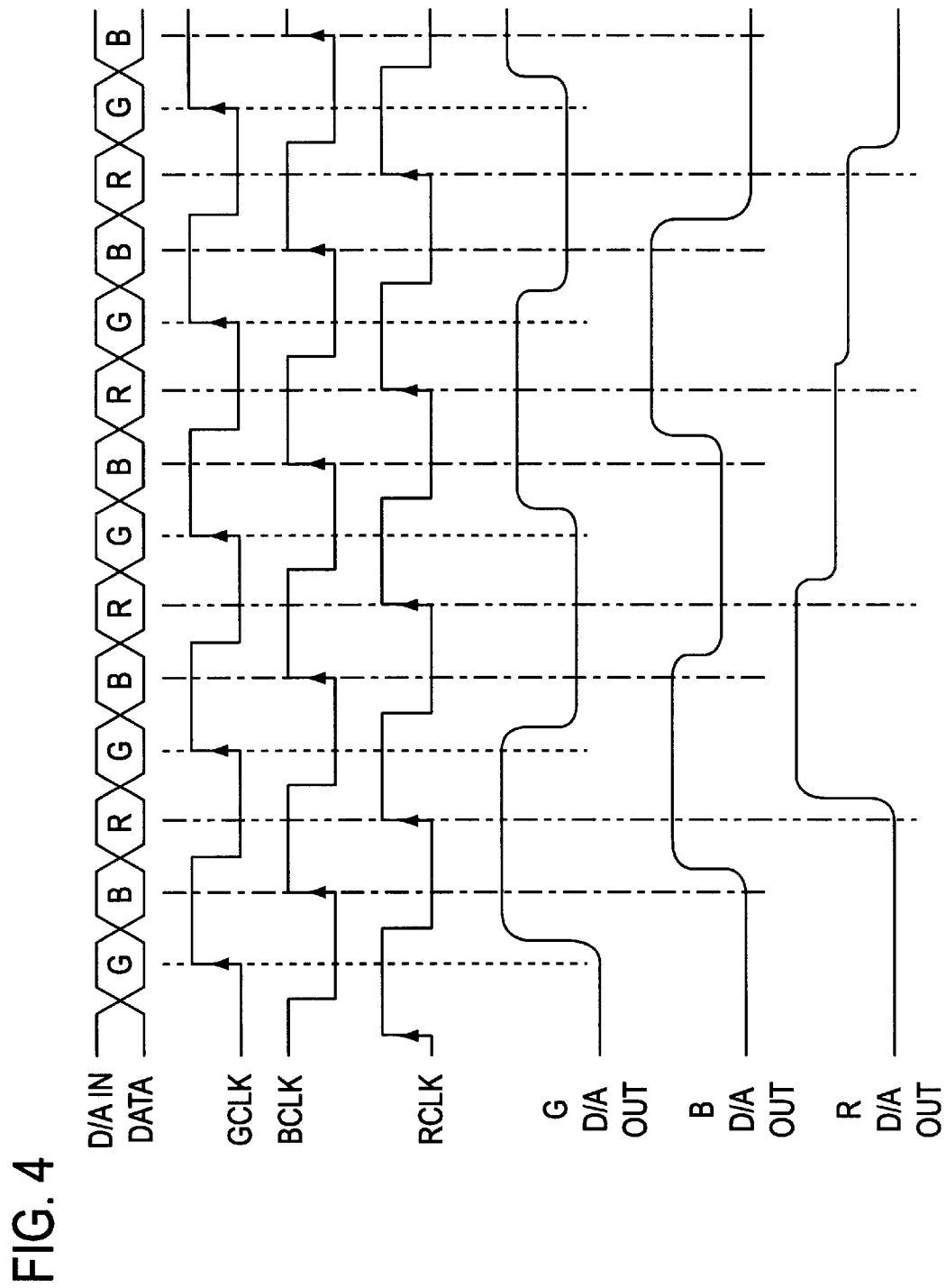
FIG. 4 is a time chart of digital/analog conversion characteristics in an electronic endoscope according to the present invention.

Data corresponding to the respective colors are sampled in the digital/analog converter circuits 27R, 27G and 27B in accordance with the timing of the input clock pulses, as shown in FIG. 4. Consequently, the digital image signals of red, green and blue lights are converted into analog image signals by the digital/analog converter circuits 27R, 27G and 27B for red, green and blue light, respectively.

Thus, the analog image signals of red (R), green (G) and blue (B) are output from the digital/analog converter circuits 27R, 27G and 27B at different timings, as can be seen in FIG. 4.

To synchronize the image signals of the three colors, delay circuits 28G and 28B are connected to the output signal lines of the digital/analog converter circuits 27G and 27B for green and blue light. For synchronization of the image signals of the three colors, the amount of delay provided to the image signal of the green light is determined to be larger than the amount of delay for the image signal of the blue light.

Figure 5:
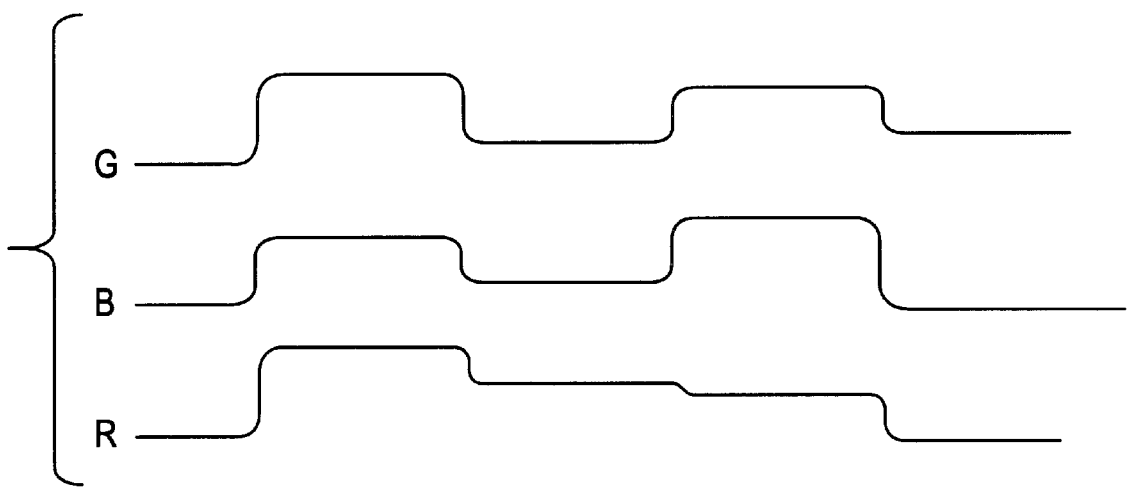
FIG. 5 is a time chart of an analog image signal output operation in an electronic endoscope according to the present invention.

Consequently, the image signals of the three primary colors (R), (G) and (B) are synchronized and are output through respective low-pass filters 29R, 29G and 29B, as can be seen in FIG. 5. Note that although only two of the three color image signals are delayed in the above-mentioned embodiment, it is possible to delay all three color image signals by appropriate delay times.

Figure 6:
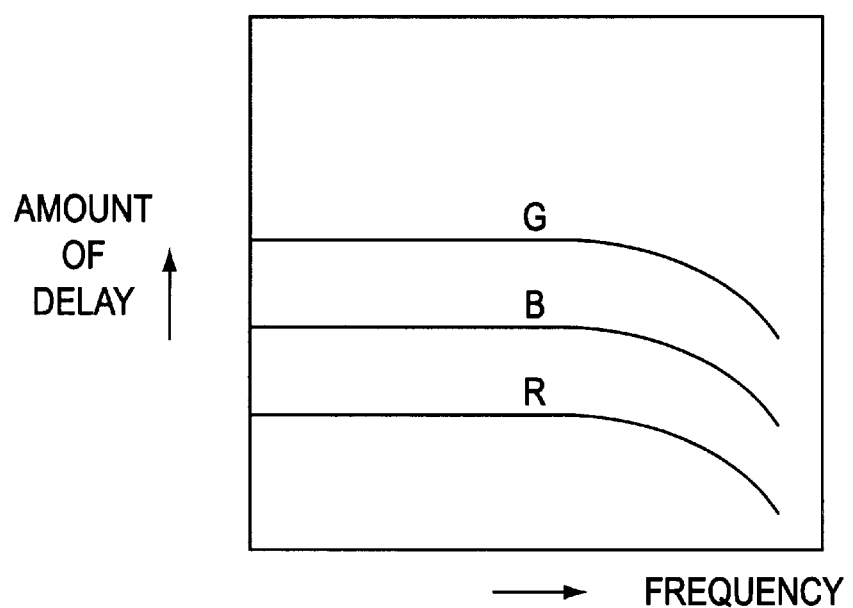
FIG. 6 is a diagram of delay characteristics of a low-pass filter in an electronic endoscope according to a second embodiment of the present invention; and, FIG. 7 is a block diagram of a circuit in an electronic endoscope according to the second embodiment of the present invention.
Figure 7:
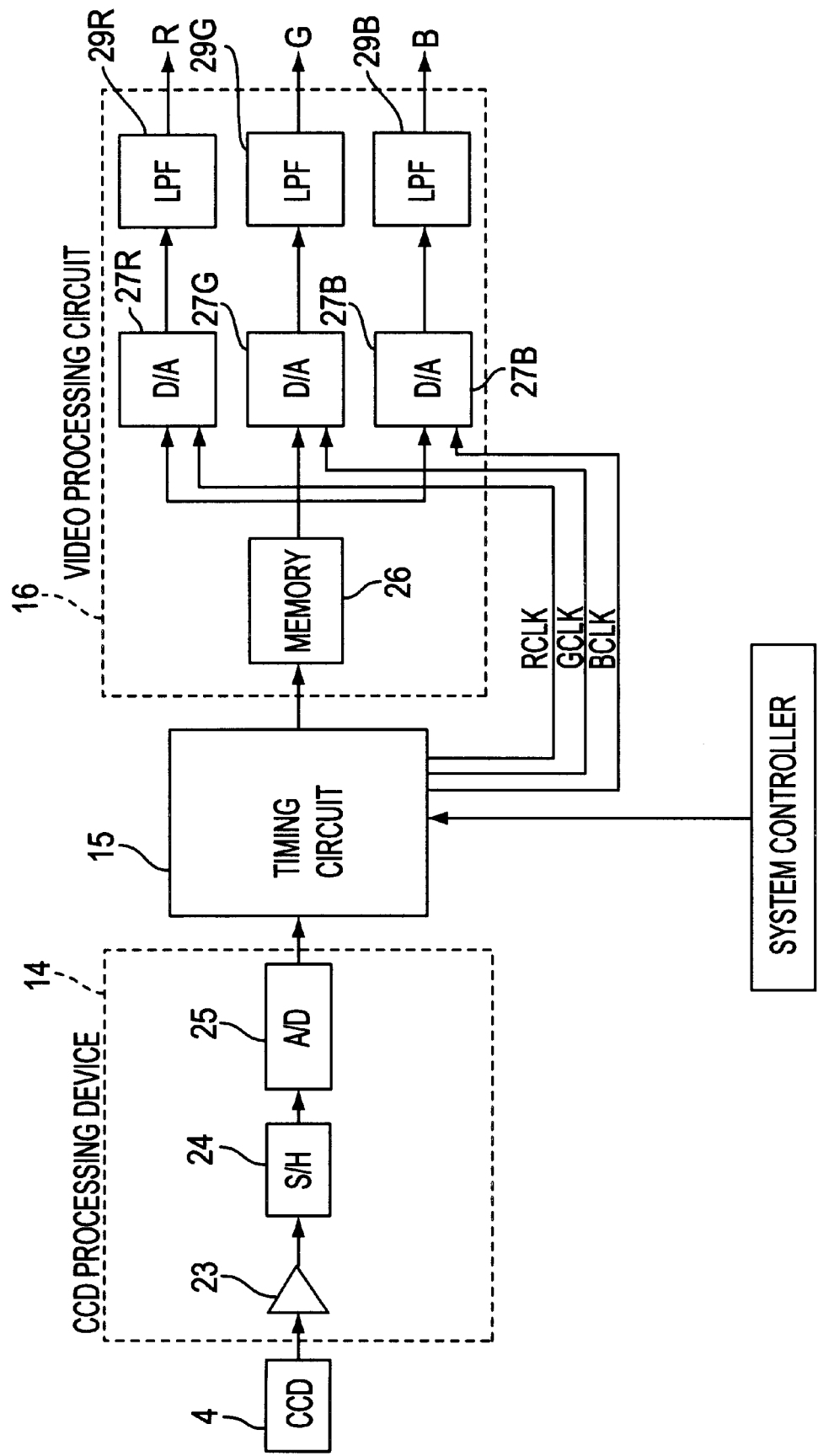

The present invention is not limited to the above-mentioned embodiment. For instance, delay characteristics of the low-pass filters 29R, 29G and 29B as shown in FIG. 6 can be selected, in which the amount by which the image signals of the three primary colors are to be delayed is different from each other. In this modification, it is possible to synchronize the image signals of the three colors without providing separate or independent delay circuits, as shown in FIG. 7.

As may be understood from the above discussion, according to the present invention, since the digital image signals of different colors picked-up by an image pickup device in a field-sequential system are temporarily stored in a single memory in a point-sequential system and are delayed by different periods of time (delay times) to synchronize the same after the image signals are converted into analog image signals, the number of signal lines necessary to process the image signals using, for example, 10 bits, can be reduced from 30 to 10, thus resulting in a realization of a small and inexpensive circuit for an electronic endoscope.

What is claimed is:

1. An electronic endoscope in which images of an object to be viewed are detected in a field-sequential system by a solid-state image pickup device, comprising:

a primary converter that converts different color image signals, detected by said solid-state image pickup device and successively output therefrom, into digital image signals;

a single memory that temporarily stores said digital image signals output from said primary converter, representing said different color image signals, said single memory storing said digital image signals in a point-sequential system having a predetermined input order of said digital image signals, said single memory outputting said digital image signals with a predetermined output order based upon said predetermined input order;

a second converter that converts said digital image signals, successively read from said single memory, into a plurality of analog image signals, said second converter outputting said plurality of analog image signals at different timings; and a delay unit that synchronizes said plurality of analog image signals by delaying a pixel of at least a second analog image signal of said plurality of analog image signals relative to a pixel of a first analog image signal of said plurality of analog image signals.

2. The electronic endoscope according to claim 1, wherein said delay unit comprises a delay circuit.

3. The electronic endoscope according to claim 1, wherein said delay unit comprises a low-pass filter having predetermined delay characteristics.

4. The electronic endoscope according to claim 1, wherein said color image signals comprise image signals of three primary colors.

5. The electronic endoscope according to claim 1, wherein said memory comprises of a frame memory for storing a frame of said color image signals picked-up by said solid-state image detected device.

6. An electronic endoscopic apparatus in which an image signal supplied from a field-sequential system by a solid-state image pickup device, incorporated in a front end of an insertion portion of an endoscope, is sent to a video processor, comprising:

an illuminating light device that sequentially emits red light, green light and blue light towards an object;

a primary converter that converts red color image signals, green color image signals and blue color image signals, detected by said solid-state image pickup device and successively output therefrom, into digital image signals;

a single memory that temporarily stores said digital image signals output from said primary converter, said single memory storing said digital image signals in a point-sequential system having a predetermined input order of said digital image signals, said single memory outputting said digital image signals with a predetermined output order based upon said predetermined input order;

a second converter that converts said digital image signals, successively read from said single memory, into three analog image signals, said second converter outputting said three analog image signals at different timings; and a delay unit that delays a pixel of a second analog image signal, of said three analog image signals, relative to a pixel of a first analog image signal, and delays a pixel of a third analog image signal, of said three analog image signals, relative to said pixel of said second analog image signal, so that all of said red color image signals, said green color image signals and said blue color image signals are synchronized with each other.

7. The electronic endoscopic apparatus according to claim 6, wherein said solid-state image pickup device detects one frame of an object image while said illuminating light device emits said red light, said green light, and said blue light, and wherein said solid-state image pickup device sequentially outputs a frame of red image signals, a frame of green image signals and a frame of blue image signals.

8. The electronic endoscope apparatus according to claim 6, wherein said delay unit comprises a delay circuit.

9. The electronic endoscope apparatus according to claim 6, wherein said delay unit comprises a low-pass filter having predetermined delay characteristics.

10. The electronic endoscope apparatus according to claim 6, wherein said memory comprises a frame memory for storing a frame of said red color image signals, said green color image signals and said blue color image signals detected by said solid-state image pickup device.

11. An electronic endoscope in which images of an object to be viewed are detected in a field-sequential system by a solid-state image pickup device, different color image signals detected by said solid-state image pickup device and successively output therefrom being converted into digital color image signals and temporarily stored in a single memory in a point-sequential system having a predetermined input order of said digital color image signals, said digital color image signals being successively output from said single memory with a predetermined output order based upon said predetermined input order, said output digital color image signals being converted into a plurality of primary color signals output at different timings, said plurality of primary color signals being synchronized by delaying a pixel of at least one primary color signal of said plurality of primary color signals.

12. The electronic endoscope according to claim 1, wherein said memory comprises a field memory for storing a field of said color image signals detected by said solid-state image pickup device.

13. The electronic endoscopic apparatus according to claim 6, wherein said solid-state image pickup device picks up one field of an object image while said illuminating light device emits said red light, said green light, and said blue light, and wherein said solid-state image pickup device sequentially outputs a frame of red image signals, a frame of green image signals and a frame of blue image signals.

14. The electronic endoscope apparatus according to claim 6, wherein said memory comprises a field memory for storing a field of said red color image signals, said green color image signals and said blue color image signals detected by said solid-state image pickup device.

15. The electronic endoscope of claim 1, wherein said point-sequential system stores said digital image signals to said memory along each horizontal line of one frame.

16. The electronic endoscopic apparatus of claim 6, wherein said point-sequential system stores said digital image signals to said memory along each horizontal line of one frame.

17. The electronic endoscope of claim 11, wherein said point-sequential system stores said digital image signals to said memory along each horizontal line of one frame.

18. The electronic endoscope of claim 11, wherein said memory comprises a field memory that stores a field of said color image signals detected by said solid-state image pickup device.

19. The electronic endoscope of claim 11, further comprising an illuminating light device that sequentially emits red light, green light and blue light towards an object.

20. The electronic endoscope of claim 19, wherein said solid-state image pickup device detects one field of an image of said object while said illuminating light device emits said red light, said green light, and said blue light.

* * * * *